United States Patent

Huntsinger

[15] 3,699,461

[45] Oct. 17, 1972

[54] ANALOG HARMONIC REJECTING PHASE DETECTOR

[72] Inventor: Dean P. Huntsinger, Marion, Iowa

[73] Assignee: Collins Radio Company, Dallas, Tex.

[22] Filed: Sept. 27, 1971

[21] Appl. No.: 183,924

[52] U.S. Cl. ..................328/134, 325/474, 328/167, 329/50, 330/30 R, 330/31, 330/126

[51] Int. Cl. ..............................................H03d 3/02

[58] Field of Search ........330/30 R, 30 D, 21, 31, 69, 330/149, 124, 126; 328/163, 165, 167, 166, 22, 13, 14, 134; 325/65, 474, 475, 476; 329/50

[56] References Cited

UNITED STATES PATENTS

| | | | |
|---|---|---|---|
| 3,081,434 | 3/1963 | Sandberg | 328/167 |
| 3,243,585 | 3/1966 | Escobosa | 330/124 R |
| 3,331,035 | 7/1967 | Strickholm | 328/14 X |
| 3,512,092 | 5/1970 | Thurnell | 328/22 X |
| 3,526,786 | 9/1970 | Snyder | 330/30 D X |
| 3,634,772 | 1/1972 | Katz | 328/134 X |

*Primary Examiner*—Alfred L. Brody
*Attorney*—Warren H. Kintzinger et al.

[57] ABSTRACT

An analog harmonic rejecting phase detector with even harmonic rejection achieved through a fundamental frequency, $f_r$, phase detector section and rejection of the stronger odd harmonic signal content passed from the input signal through the fundamental frequency section. It includes a plurality of odd harmonic frequency phase detector sections such as $3f_r$, $5f_r$ and possibly other odd harmonic sections up to and including a $(2n - 1)f_r$ odd harmonic section. The reference signals $3f_r$, $5f_r$, etc., are square waves so phase related relative to $f_r$ as to achieve mutual cancelling with like harmonic content in the signal being passed through an invert-noninvert amplifier of the fundamental frequency section and passed to a summing amplifier. This requires an attenuator circuit after an invert-noninvert amplifier in each odd harmonic section to properly balance signal strength to the strengths of their respective counterparts passed through the fundamental frequency section. The resulting output of the summing amplifier is so integrated through a low pass filter as to present a plus or minus output voltage indicative of the input signal, $f_{in}$, phase lead or lag and the magnitude of phase displacement relative to the square wave reference signal $f_r$.

6 Claims, 4 Drawing Figures

ANALOG HARMONIC REJECTING PHASE DETECTOR

Figure 1:
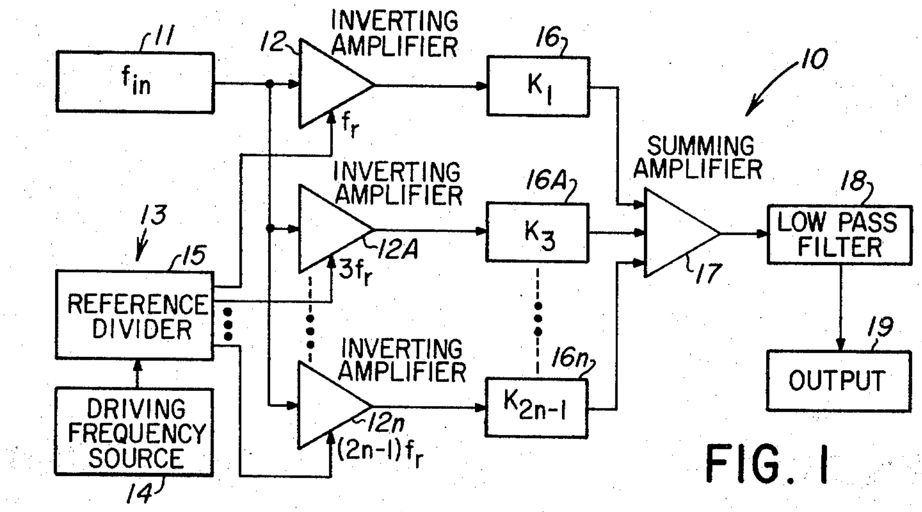

This invention relates in general to phase detection and, in particular, to an analog harmonic rejecting phase detector usable with normal sine wave signals.

The analog harmonic rejecting phase detector is readily capable of rejecting any even harmonic and providing good rejection of odd harmonics present in the input signal, $f_{in}$. While the detector rejects all even harmonic distortion, it rejects only those odd harmonic frequencies for which special circuit arrangements are provided. Since, however, there is an attenuation factor of $1/n$ for various harmonics through the fundamental detector portion of the overall detector, the number of odd harmonic frequency nullifying detector sections is limited to only a few.

It is, therefore, a principal object of this invention to provide an analog harmonic rejecting phase detector with even harmonic rejection and good rejection of stronger odd harmonic content in the input signal.

Another object is to provide such an analog harmonic rejecting phase detector having specific odd harmonic frequency nullifying detector sections giving efficient odd harmonic content rejection.

Features of the invention useful in accomplishing the above objects include, in an analog harmonic rejection phase detector, a fundamental even harmonic rejection section and specific odd harmonic frequency nullifying detector sections such as 3, 5, 7 and possibly higher odd multiple harmonic sections for rejection of specific odd harmonics of the input signal frequency. This includes phasing of the odd harmonic sections to cancel the same harmonic frequency content of the fundamental section. Further, since there is a stronger signal at an odd harmonic frequency through the invert-noninvert amplifier of the respective odd harmonic frequency sections than that odd harmonic signal content passed through the fundamental section, attenuation circuit sections are provided so that the odd harmonic signals when recombined through a summing amplifier substantially achieve mutual cancellation; i.e., rejection. A multiple square wave frequency reference signal source is part of the phase detector with square wave reference signals $f_r$, $3f_r$ and other odd harmonics up to and including $(2n-1)f_r$, the highest odd harmonic frequency for a specific highest odd harmonic frequency section provided.

A specific embodiment representing what is presently regarded as the best mode of carrying out the invention is illustrated in the accompanying drawing.

Figure 2:
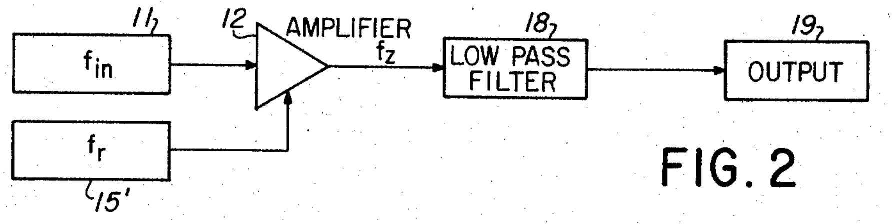
Figure 3:
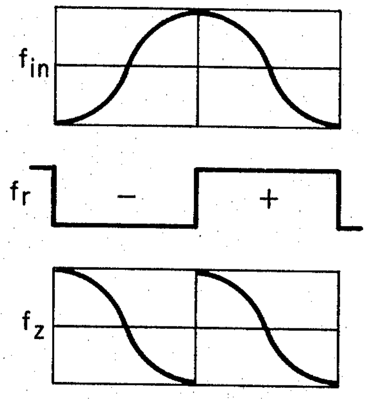
Figure 4:
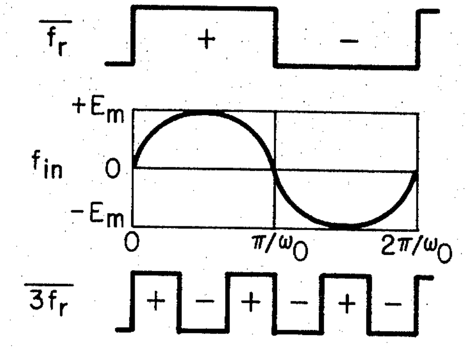

In the drawing:

FIG. 1 represents a block diagram of a harmonic rejecting analog signal phase detector in accord with applicant's teachings;

FIG. 2, a block diagram of a fundamental even harmonic rejecting analog signal phase detector without any circuit provisions for rejection of odd harmonic frequencies such as provided with the embodiment of FIG. 1;

FIG. 3, waveforms for the input signal, $f_{in}$, the square wave reference input signal, $f_r$, and the resultant invert-noninvert waveform, $f_z$, out of the invert-noninvert amplifier of FIG. 2, containing phase information between $f_r$ and $f_{in}$; and FIG. 4, waveforms $\overline{f_r}$, the inversion of $f_r$, $f_{in}$ phase shifted 90° from $f_{in}$ of FIG. 3, and $\overline{3f_r}$ the inversion of the first odd harmonic reference $3f_r$.

Referring to the drawing:

The harmonic rejecting analog signal phase detector 10 of FIG. 1 includes a fundamental frequency signal $f_{in}$ source 11 with the input signal subject to phase variation and having harmonic signal content. The $f_{in}$ signal source 11 is connected to feed $f_{in}$ as an input to invert-noninvert amplifier 12 that is also provided with a square wave reference frequency $f_r$ from reference frequency source 13. Reference frequency source 13 is shown to include a driving frequency source 14 having a high enough driving frequency feed to reference divider 15 to generate the base square wave reference frequency signal $f_r$, the odd reference frequency $3f_r$ square wave signal and such intervening odd harmonic square wave reference signals up to and including the odd harmonic square wave reference frequency $(2n-1)f_r$ that specific sections are provided for. The output of the invert-noninvert amplifier 12 is passed to and through the $K_1$ factor attenuator circuit 16 as a balanced strength input to summing amplifier 17 that has an output connection to and through low pass filter circuit 18 to output utilizing circuitry 19.

The input signal $f_{in}$ from signal source 11 is also connected as an input to invert-noninvert amplifier 12A also having a square wave $3f_r$ input signal connection from the reference divider 15 of reference frequency source 13. The $f_{in}$ signal from signal source 11 is also connected to feed intervening invert-noninvert amplifiers up to and including invert-noninvert amplifier 12*n* also having a square wave $(2n-1)f_r$ input signal connection from the reference divider 15 in individual specific odd harmonic detector sections. The outputs of invert-noninvert amplifiers 12A through 12*n* are connected to attenuator circuits 16A through 16*n*, respectively, having attenuation factors $K_3$ through $K_{(2n-1)}$. Attenuation is increased successively by the odd factors 3, 5, 7 through to $2n-1$ for the successively high odd harmonic sections since the detector response for the specific harmonic sections increases, respectively, in strength by factors equivalent to successively the ratios of $3f_r/f_r$, $5f_r/f_r$, $7f_r/f_r$ through $(2n-1)f_r/f_r$. The outputs of odd harmonic detector section attenuator circuits 16A through 16n are connected as additional inputs to summing amplifier 17. The resulting net summed signal output of the summing amplifier 17 is so integrated through low pass filter 18 as to present a plus or minus output voltage to utilizing circuitry indicative of the input signal, $f_{in}$, phase lead or lag and magnitude of phase displacement relative to the square wave reference signal, $f_r$.

With reference to the simple fundamental even harmonic rejecting analog signal phase detector of FIG. 2 the detector includes invert-noninvert amplifier 12, input fed by a signal frequency, $f_{in}$, from signal source 11 and a square wave reference signal $f_r$ from reference signal source 15' followed by low-pass filter 18. Amplifier 12 is an invert-noninvert type amplifier passing $f_{in}$ directly for the first 180° of $f_r$ and then inverting $f_{in}$ for the remaining 180° of $f_r$ through each $f_r$ signal cycle. Waveform $f_r$ controls the amplifier 12 internal inverting mechanism (detail not shown) and the amplifier operates as a class A amplifier. The waveforms $f_{in}$, $f_r$, and $f_z$ at the various respective points in the phase detector of FIG. 2 are shown in FIG. 3. Note that the $f_z$ waveform, passed to the low-pass filter 18, contains the phase differential information between $f_r$ and $f_{in}$.

Further, the area under the $f_z$ curve represents a positive quantity for the lag conditions and a negative quantity for the lead conditions with amplifier 12 as controlled by $f_r$ converting $f_{in}$ to a form from which phase information can be extracted by integration through low-pass filter 18 for use by utilizing circuitry 19.

Referring also to the $\overline{f_r}$ and the 90° lead phase shifted $f_{in}$, relative to $f_{in}$ of FIG. 3, of FIG. 4 the detector of FIG. 2 or the detector section of amplifier 12 in FIG. 1, are referred to as the fundamental detector since the controlling signal is $f_r$. Plus and minus signs are shown associated with $f_r$ in FIG. 3 and with $\overline{f_r}$ in FIG. 4. The plus sign represents the noninverting usage and the minus sign the inverting usage.

The equation $$e_{out}=E_m\frac{\omega_0}{(2\pi)}\int_0^{\pi/\omega_0}\sin\,(n\omega_0t+\phi)\,dt-E_m\frac{\omega_0}{(2\pi)}\int_{\pi/\omega_0}^{2\pi/\omega_0}\sin\,(n\omega_0t+\phi)\,dt. \tag{1}$$

represents the area under the curve, $f_z$, and is observed at the output of the low-pass filter 18. The next equation $$e_{out}=2E_m\frac{\omega_0}{(2\pi)}\int_0^{\pi/\omega_0}\sin\,(n\omega_0t+\phi)\,dt \tag{2}$$

is the condensed form of Equation 1 and the following derivation results in Equation 3:

$$\begin{aligned}
&e_{out}=0 && \text{for } n \text{ even}\\
&e_{out}=1/n\;2E_m/\pi\cos(\phi) && \text{for } n \text{ odd}\\
&e_{out_1}=1(K\cos\phi)\\
&e_{out_3}=1/3(K\cos\phi)\\
&e_{out_5}=1/5(K\cos\phi) && K=2E_m/\pi\\
&\qquad\vdots\\
&e_{out_n}=1/n(K\cos\phi)
\end{aligned} \tag{3}$$

Examination of Equation 3 shows that the detector response to all even harmonic frequencies is zero. This is because both halves, or zero crossings, of $f_{in}$ were used in the detection process. Another way of describing this phenomenon is that there is even symmetry for the function described. Observe that the gain increase factor of 2 is also present in the constant for the coefficients. The detector does respond to the odd harmonics present, but presents an attenuation factor of $1/n$ where $n$ is the number of a specific odd harmonic referred to.

Assume that the source of $f_r$ also generates a coherent $3f_r$. Let the third harmonic of $f_r$ become the control signal for another detector and pass $f_{in}$ through this detector. With reference also to $3f_r$ or the $\overline{3f_r}$ waveform of FIG. 4, the following mathematical analysis is for the detector shown in FIG. 2 with $f_r$ replaced by $3f_r$. When a detector is operated in this manner, it will be referred to as the third harmonic detector.

$$e_{in}=E_m\sin\,(n\omega_0t+\phi)\,(f_{in})$$

$$\begin{aligned}
e_{out}=&+E_m\frac{\omega_0}{(2\pi)}\int_0^{\pi/3\omega_0}\sin\,(n\omega_0t+\phi)\,dt-E_m\frac{\omega_0}{(2\pi)}\int_{\pi/3\omega_0}^{2\pi/3\omega_0}\sin\,(n\omega_0t+\phi)\,dt\\
&+E_m\frac{\omega_0}{(2\pi)}\int_{2\pi/3\omega_0}^{\pi/\omega_0}\sin\,(n\omega_0t+\phi)\,dt-E_m\frac{\omega_0}{(2\pi)}\int_{\pi/\omega_0}^{4\pi/3\omega_0}\sin\,(n\omega_0t+\phi)\,dt\\
&+E_m\frac{\omega_0}{(2\pi)}\int_{4\pi/3\omega_0}^{5\pi/3\omega_0}\sin\,(n\omega_0t+\phi)\,dt-E_m\frac{\omega_0}{(2\pi)}\int_{5\pi/3\omega_0}^{2\pi/\omega_0}\sin\,(n\omega_0t+\phi)\,dt
\end{aligned} \tag{4}$$

$$\begin{aligned}
&e_{out}=0 && \text{for } n \text{ even}\\
&e_{out}=\frac{2E_m}{n\pi}\cos\phi\,[1-2\cos\,(n\pi/3)] && \text{for } n \text{ odd}\\
&e_{out_3}=1(K\cos\phi)\\
&e_{out_9}=1/3(K\cos\phi)\\
&\qquad\vdots\\
&e_{out_{3n}}=3/n(K\cos\phi)
\end{aligned} \tag{5}$$

Equation 4 represents the signed sum of the segments of area defined by $3f_r$. Equation 5 is the resulting detector response. Again there is no response to the even harmonic frequencies; that is, the even harmonic frequencies relative to $3f_r$ instead of $f_r$ in this instance. Note that the detector only responds to the odd harmonics of the amplifier driving signal, $3f_r$, and that this frequency is the lowest to which a response occurs. Also note that odd harmonic detector section responses in the detector 10 of FIG. 1 are stronger respectively by factors of $3f_r/f_r$, $5f_r/f_r$, through to and including $(2N-1)f_r/f_r$ than the response of the fundamental detector to the respective odd harmonic content in $f_{in}$ for each of the odd harmonics provided for. This also applies with respect to odd harmonic sections relative to those harmonic sections thereabove that are odd harmonic sections thereof.

A generalized expression is given in equation 6 for the result of any odd harmonic detector. If the third harmonic detector response is desired, use of equation 6 for $m$=3 will result in equation 5.

$$\begin{aligned}
&e_{out_{nm}}=1/n\;2E_m/\pi\cos\phi && \text{for } n \text{ odd}\\
&e_{out_{nm}}=0 && \text{for } n \text{ even}
\end{aligned} \tag{6}$$

$m$: harmonic number of $f_r$ used
$n$: harmonic response number

Each odd harmonic of the harmonic rejecting analog phase detector of FIG. 1, for which rejection is desired, has an associated invert-noninvert amplifier. The signed, weighted sum of all the amplifiers is accomplished by summing amplifier 17 and passed through low-pass filter 18. The odd harmonic responses of the fundamental detector are subtracted by the respective odd harmonic detectors to obtain substantially only a response to the fundamental frequency with subtraction accomplished with properly phased $mf_r$ signals with respect to $f_r$. The desired phase control may be accomplished by appropriate phasing of the respective odd harmonic reference signals within the reference divider 15 by conventional techniques for achieving such desired signal phase relation. Gains are equalized by attenuators in each leg, where the attenuation ratio is m for each harmonic detector when the fundamental detector attenuation ratio, $K_1$, is unity.

EQUATION 7

$$e_{out} = R_1 + (R_3 - R_3) + (R_5 - R_5) + \ldots + (R_{2n-1} - R_{2n-1}) + R_{2n+1} + \ldots 7$$

illustrates how with the harmonic rejection phase detector various responses, $R$, cancel to obtain only a fundamental response. It should be noted that all the harmonic responses of each harmonic detector are canceled. Therefore, the third harmonic detector nullifies the third, ninth, fifteenth, and so forth, harmonic responses of the fundamental detector. While it is obviously expensive to apply many harmonic detectors, the attenuation factor of $1/n$ presented by the fundamental detector helps in limiting the number of odd harmonic nullifying detector sections required.

Whereas this invention is here illustrated and described with respect to a specific embodiment hereof, it should be realized that various changes may be made without departing from the essential contributions to the art made by the teachings hereof.

I claim:

1. In an analog harmonic phase detector, a fundamental frequency phase detector section including a first invert-noninvert amplifier connectable for receiving a fundamental frequency ($f_{in}$) from a frequency source, and connected for receiving a square wave input reference signal ($f_r$); square wave reference frequency $f_r$ generating means; odd harmonic, relative to the fundamental frequency of the phase detector, phase detector odd harmonic section means including at least a $3f_r$ odd harmonic frequency phase detector section having a second invert-noninvert amplifier connectable for receiving $f_{in}$ and connected for receiving a $3f_r$ square wave signal; said square wave reference frequency $f_r$ generating means being also the source for the $3f_r$ square wave signal; summing amplifier means circuit means signal input connected to the signal outputs of said first and second invert-noninvert amplifiers; and low pass signal integrating means connected to receive the output of said summing amplifier means and output connectable to phase detected signal utilizing circuitry.

2. The analog harmonic phase detector of claim 1, wherein said phase detector odd harmonic section means includes a plurality of successively higher odd harmonic phase detector sections including said $3f_r$ odd harmonic phase detector section; a plurality of invert-noninvert amplifiers, one for each of said plurality of successively higher odd harmonic phase detector sections; and reference frequency generating means having a plurality of square wave outputs including said square wave reference frequency $f_r$ and successively higher odd harmonic square wave signals, starting with the $3f_r$ odd harmonic reference signal, each connected as a controlling reference signal input for respective invert-noninvert amplifiers of the individual odd harmonic phase detector sections.

3. The analog harmonic phase detector of claim 2, wherein signal attenuating means is provided in the circuit interconnect means interconnecting the invert-noninvert amplifier of each odd harmonic phase detector section and an input of said summing amplifier means.

4. The analog harmonic phase detector of claim 3, wherein attenuating means attenuation factors are graduated factors successively from the first odd harmonic phase detector section upward through the higher odd harmonic phase detector sections.

5. The analog harmonic phase detector of claim 4, wherein said square wave odd harmonic reference signals and the square wave reference frequency $f_r$ are phase controlled for mutual cancellation, respectively, of like harmonic signal content passed through said fundamental frequency phase detector section to said summing amplifier.

6. The analog harmonic phase detector of claim 5, wherein said reference frequency square wave signal generating means includes, a driving frequency source; a reference divider driven by said driving frequency source and having a plurality of individual square wave signal output connections for the $f_r$, $3f_r$ and successive higher odd frequency reference signals used for the phase detector; and reference square wave signal phase control means with said reference frequency square wave signal generating means phasing said $f_r$ and the odd harmonic square wave reference signals for odd harmonic rejection.

* * * * *